United States Patent [19]

Crummy et al.

[11] Patent Number: 5,479,764

[45] Date of Patent: Jan. 2, 1996

[54] NONPOWERED DISC SCALPING APPARATUS FOR SUGAR BEETS AND LIKE PLANTS

[76] Inventors: Paul R. Crummy, Rte. 1, Box 108A; Kevin M. Crummy, P.O. Box 15, both of Argyle, Minn. 56713

[21] Appl. No.: 159,377

[22] Filed: Nov. 30, 1993

[51] Int. Cl.$^6$ .................................................. A01D 23/02
[52] U.S. Cl. ...................... 56/121.4; 56/121.46; 171/30; 171/41
[58] Field of Search .......................... 56/121.4, 121.46; 171/30, 41, 42

[56] References Cited

U.S. PATENT DOCUMENTS

| | | | |
|---|---|---|---|
| 584,724 | 6/1897 | Frennet-Wauthier | 171/40 |
| 709,720 | 9/1902 | Palmer | 56/121.4 |
| 1,411,804 | 4/1922 | Mueller | 56/121.4 |
| 1,620,019 | 3/1927 | Hammer et al. | 171/42 |
| 1,951,444 | 3/1934 | Sands | 56/121.46 X |
| 3,059,399 | 10/1962 | Oppel | 56/121.46 |
| 3,151,433 | 10/1964 | Everett et al. | 56/121.46 |
| 3,420,312 | 1/1969 | Greedy | 56/121.46 X |
| 3,423,914 | 1/1969 | Itami | 56/121.46 |
| 3,583,136 | 6/1971 | Eisenhardt et al. | 56/121.43 |

OTHER PUBLICATIONS

The Universal Encyclopedia of Machines or how things work, George Allen & Unwin Ltd, London, Ruskin House Museum Street, Bet–Harvesting Machine, pp. 434 and 435.
Lockwood Corporation—parts book pages, with scalpers believed used at least as early as Oct. 1, 1974.
Figures 18 and 19—Optional Scalpers for Farmhand defoliators believed used at least as early as 1974.
1992 Sugarbeet Research and Extension Reports, Jan. 1993, Beet Topping Unit (Scalper), p. 279.

*Primary Examiner*—Randolph A. Reese
*Assistant Examiner*—Christopher J. Novosad
*Attorney, Agent, or Firm*—Peterson, Wicks, Nemer & Kamrath

[57] ABSTRACT

A scalping apparatus (10) is disclosed including a disc (32) having a circular periphery rotatably mounted upon a pivot post (46) located below and behind the lower surface of the disc (32). The axis (34) of the disc (32) is tilted at an acute angle in the order of 30° from the ground surface and in a vertical plane which extends at a nonparallel angle preferably in the order of 30°–40° from the row (14) of sugar beets being scalped. In the most preferred form, the angular offset of the disc (32) causes the disc (32) to rotate about its axis (34) with the horizontal movement of the apparatus (10) such that rotation of the disc (32) need not be powered. The mount (38) of the disc (32) is adjustably positioned relative to the carriage of a shoe (16) which slides on the sugar beets and vertically moves relative to the ground surface. The trailing edge (22) of the shoe (16) extends at a nonparallel angle preferably in the order of 30°–40° from the row (14) of sugar beets being scalped and generally parallel to and spaced from a tangent to the circular periphery of the disc (32). The apparatus (10) is centered on the row (14) of sugar beets so that the sugar beets engage the disc (32) at the lowest point of the circular periphery.

20 Claims, 1 Drawing Sheet

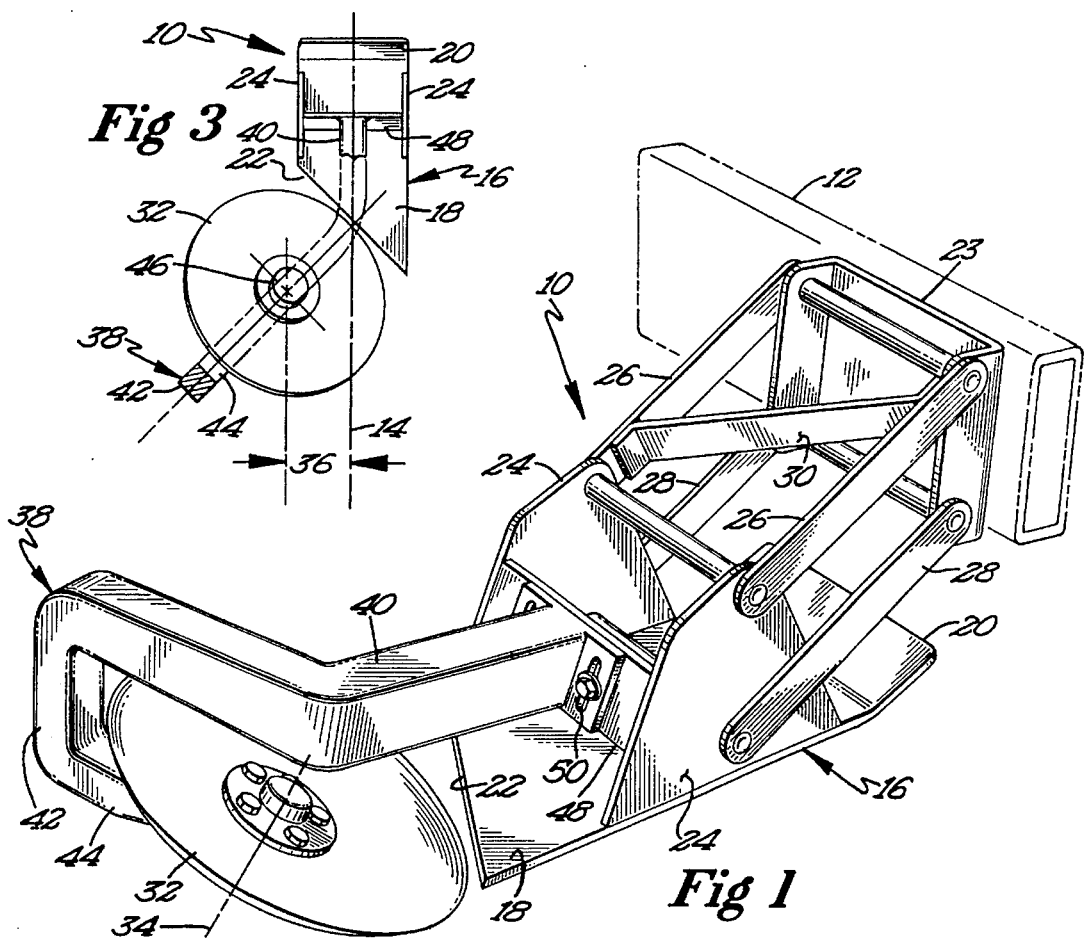
Fig 3
Fig 1
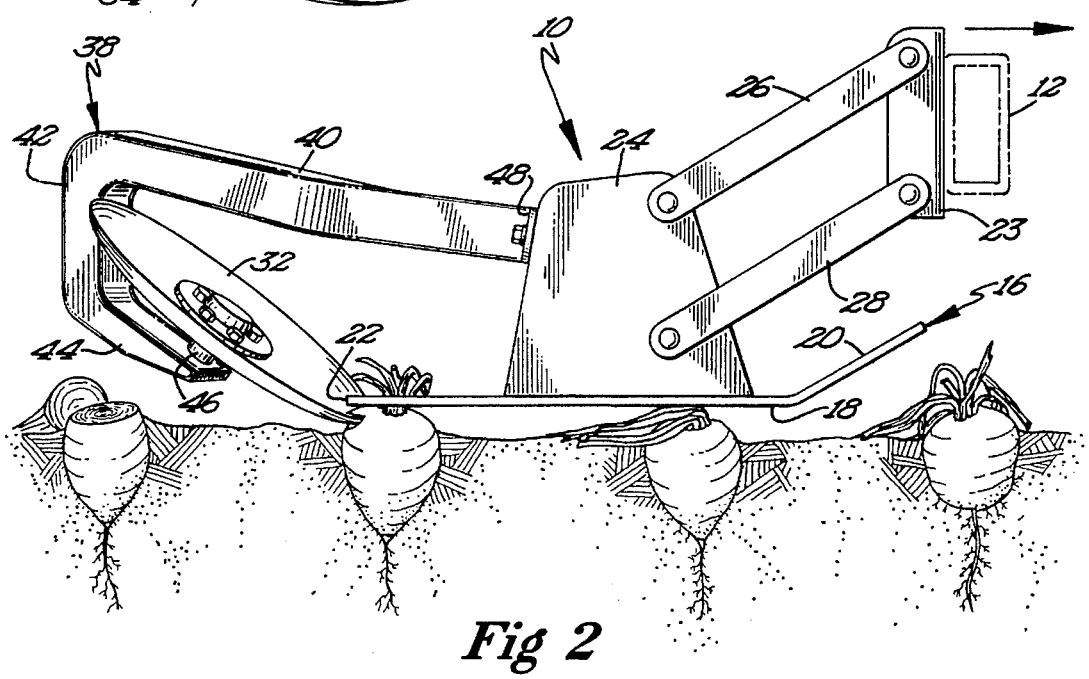
Fig 2

NONPOWERED DISC SCALPING APPARATUS FOR SUGAR BEETS AND LIKE PLANTS

BACKGROUND

This invention relates generally to scalping apparatus for sugar beets and like plants, relates particularly to disc scalping apparatus, and specifically relates to nonpowered disc scalping apparatus.

Prior to lifting, the leaves and stems are desired to be removed from sugar beets. This is conventionally performed by a defoliator which typically includes one or more rotors which are rotated to cut the greens or foliage of the beets. The defoliator further typically includes a scalper which cuts any remaining leaves as well as the stem from the beets while the beets are in the ground. Prior scalpers are generally of three types, i.e. a stationary blade, a powered disc, or a nonpowered disc with a stationary blade scalper, a blade is held at an angle to the row as the defoliator is moved parallel to the row. The major problem with blade scalpers is that the blades become dull due to the close proximity to the ground and beet leaves and other debris tend to wrap around the cutting edge of the blade. Powered disc scalpers such as the type shown in U.S. Pat. No. 3,583,136, but which currently are powered by hydraulic motors, have less tendency to be wrapped by debris but are relatively expensive to manufacture and maintain. Prior nonpowered disc scalpers, while avoiding the costs of the drive components of prior powered disc scalpers, had difficulty in keeping the disc rotating and did not operate very well. Thus, prior to the present invention, nonpowered disc scalpers did not have large market acceptance.

Thus, a need exists for improved scalpers which avoid the disadvantages and shortcomings of prior scalpers.

SUMMARY

Surprisingly, this need in the field of scalping sugar beets or like plants can be satisfied by providing, in the most preferred form, a nonpowered disc scalping apparatus including a disc which is rotatably mounted about an axis which is tilted at an acute angle in the order of 30° in the preferred form in a vertical plane which is generally perpendicular to the ground surface and which extends at an offset, substantially nonparallel angle in the order of 30°–40° to the horizontal movement direction and the row in the preferred form. In the most preferred form, the shoe which slides on the row of plants has a trailing edge which is spaced from and parallel to a tangent of the circular periphery of the disc.

In a further aspect of the present invention, the disc of a scalping apparatus is rotatably mounted from beneath the lower surface to keep dirt and moisture from entering the bearings of the disc and to provide a wide open space above the upper surface giving no place for trash to catch on.

It is thus an object of the present invention to provide a novel disc scalping apparatus for sugar beets and like plants.

It is further an object of the present invention to provide such a novel disc scalping apparatus which is not powered.

It is further an object of the present invention to provide such a novel disc scalping apparatus which is self-sharpening.

It is further an object of the present invention to provide such a novel disc scalping apparatus which does not have a tendency to clog.

It is further an object of the present invention to provide such a novel disc scalping apparatus which is relatively inexpensive to manufacture and maintain.

It is further an object of the present invention to provide such a novel disc scalping apparatus which protects the bearings from dirt and moisture.

It is further an object of the present invention to provide such a novel disc scalping apparatus which is rotated by the horizontal movement of the apparatus.

It is further an object of the present invention to provide such a novel disc scalping apparatus which engages the beets in the row at the lowest point of the periphery.

It is further an object of the present invention to provide such a novel disc scalping apparatus which rotatably mounts the disc from behind and below the disc.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a perspective view of a nonpowered disc scalping apparatus according to the preferred teachings of the present invention.

FIG. 2 shows a side view of the nonpowered disc scalper apparatus of FIG. 1.

FIG. 3 shows a diagramatic top view of the nonpowered disc scalper apparatus of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore when the terms "top", "bottom", "first", "second", "forward", "behind", "front", "back", "upper", "lower", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the invention.

DESCRIPTION

A nonpowered disc scalping apparatus according to the preferred teachings of the present invention is shown in the drawings and generally designated 10. In the most preferred form, scalper 10 is secured to the trailing edge of a defoliator, a portion of which is shown in phantom in FIGS. 1 and 2 and designated 12. Defoliator 12 is moved along a ground surface in a horizontal movement direction parallel to the row of sugar beets or like plants from which the upper portions or foliage are desired to be removed, with the row being diagramatically shown in FIG. 3 and designated 14. The beets each generally include a root portion at least partially embedded in the ground surface and foliage extending from a stem from the root. It, of course, can be appreciated that a multiplicity of apparatus 10 are provided corresponding to the number of rows 14 to be defoliated by defoliator 12. It can further be appreciated that defoliator 12 can be of a variety of types and does not form part of the present invention.

Apparatus 10 generally includes a shoe 16 for sliding on the tops of the beets in row 14. Generally, shoe 16 includes a bottom 18 having an upwardly inclined front portion 20 and a trailing edge 22. Portion 20 is inclined at a small acute angle to engage with and cam over the tops of the beet in row 14. In the preferred form of the present invention, edge 22 is at an acute angle in the order of 20°–45° and in the most preferred form in the order of 30°–40° from row 14 and the horizontal movement direction for purposes to be explained further hereinafter.

Apparatus 10 generally includes a suitable carriage for shoe 16 for moving shoe 16 in a horizontal direction with defoliator 12 parallel and relative to row 14 while allowing shoe 16 to remain level generally parallel to the ground surface and to move vertically perpendicular to row 14, the horizontal movement direction, and the ground surface and corresponding to the height of the tops of the beets in row 14. The carriage can be of a variety of constructions such as those which are currently utilized in scalpers such as but not limited to the type shown. Specifically, in the form shown, a bracket 23 can be suitably secured to defoliator 12 by any suitable means. A pair of uprights 24 extend vertically from shoe 16 in a spaced parallel relation. First and second pair of parallelogram arms 26 and 28 have their first ends pivotally mounted to bracket 23 and their second ends pivotally mounted to uprights 24 at equally spaced parallel axes extending perpendicular to rows 14 and the horizontal movement direction. Suitable bracing 30 can be provided such as between arms 26 as shown. Further, suitable provisions, not shown, can be provided for elevating shoes 16 and scalping apparatus 10 above the ground surface into a transport position. It can be appreciated that the carriage for shoe 16 can be of a variety of types and does not form part of the present invention.

Apparatus 10 according to the teachings of the present invention includes a disc 32 rotatably mounted about an axis 34. Disc 32 includes a generally circular periphery, an upper surface, and a lower surface, with the upper and lower surfaces typically being concave in shape as shown. Axis 34 is tilted at an acute angle to the ground surface in a vertical plane extending generally perpendicular to the ground surface and generally parallel to rows 14 and the horizontal movement direction. According to the teachings of the present invention, axis 34 is also tilted at an acute angle in a vertical plane extending generally perpendicular to the ground surface and generally perpendicular to rows 14 and the horizontal movement direction. Further, according to the teachings of the present invention, axis 34 is offset by a distance 36 in a direction in a vertical plane extending generally perpendicular to the ground surface and generally perpendicular to rows 14 and the horizontal movement direction such that the beets of row 14 engage the outer periphery of disc 32 at its lowest point relative to shoe 16. In the preferred form, edge 22 is at an acute angle in the order of 20°–45° and in the most preferred form in the order of 30°–40° to rows 14 and the horizontal movement direction and is parallel to and spaced from a tangent to the outer periphery of disc 32 at the point that row 14 engages the outer periphery. In the preferred form, axis 34 is tilted at an acute angle in the order of 30° in a vertical plane perpendicular to the ground surface depending upon the particular shape and size of disc 32 and which is substantially non-parallel to rows 14 and the horizontal movement direction and in the most preferred form which is parallel to the diameter of disc 32 which includes the point on the periphery where the beets of row 14 engage disc 32 and in the embodiment shown extends at an acute angle in the order of 20°–45° and particularly 30°–40° to rows 14 and the horizontal movement direction.

Disc 32 is mounted for rotation to the carriage for shoe 16 by a mount 38 according to the preferred teachings of the present invention. Specifically, in the preferred form shown, mount 38 includes a first arm 40 having a first, free end and a second end connected to the first end of a second arm 42. In the preferred form, arm 40 is located above the upper surface of disc 32. The second end of arm 42 is connected to the first end of a third arm 44. In the preferred form, arm 42 is located behind disc 32 in the horizontal movement direction. The second end of arm 44 is free and includes an upstanding pivot post 46 about which disc 32 is rotatably mounted by suitable bearings or other conventional means. Thus, pivot post 46 is located below and behind the lower surface of disc 32 in the horizontal movement direction, with arm 44 located beneath the lower surface of disc 32. The first end of arm 40 is vertically adjustably mounted to a brace 48 extending between uprights 24 such as by elongated slots 50. Vertical adjustment of mount 38 relative to the carriage allows the vertical spacing between disc 32 and shoe 16 to be adjusted to vary the amount cut from the tops of the beets in row 14. In the most preferred form, arm 44 extends at an obtuse angle to arm 42 and is parallel to disc 32. Although in the preferred form shown disc 32 is held at a fixed angle to the ground surface due to the integral connection between arms 40, 42, and 44, suitable provisions can be provided to allow the angle of the tilt of disc 32 and axis 34 to be adjusted such as but not limited to by adjustably, pivotally connecting arm 42 to arm 40. In the preferred form shown, arm 40 includes a first portion extending parallel to and above row 14 from the carriage to trailing edge 22 and a second portion extending parallel to and above arm 44 and the diameter of disc 32 which includes the point on the periphery where the beets of row 14 engage disc 32 from the first portion to arm 42. However, arm 40 could have other configurations such as straight extending parallel to and above arm 44 and the diameter of disc 32 which includes the point on the periphery where the beets of row 14 engage disc 32 from the carriage to arm 42.

Now that the basic construction of apparatus 10 according to the preferred teachings of the present invention have been explained, the operation and some advantages of apparatus 10 can be set forth and appreciated. Specifically, as defoliator 12 is moved generally parallel to rows 14, apparatus 10 is moved in a horizontal direction parallel to rows 14. In particular, as defoliator 12 moves, beets in rows 14 while still in the ground pass beneath defoliator 12 where the rotors or other apparatus generally remove most of the foliage from the beets. As defoliator 12 continues to move forward, the beets in rows 14 are located behind defoliator 12 and are engaged by the forward portion 20 of shoe 16 which moves with defoliator 12. Further forward movement of defoliator 12 and shoe 16 causes the shoe 16 to cam over and slide on the tops of the beets in row 14, with row 14 being generally centered between the side edges of shoe 16 in the most preferred form. It can then be appreciated that the height of the tops of the beets in row 14 above the ground surface can vary, with shoe 16 moving vertically due to the parallelogram mounting provided by the carriage of the preferred form. Thus, due to the mounting of mount 38 to and for relative movement with shoe 16 by the carriage, mount 38 and disc 32 move vertically perpendicular to the ground surface according to the heights of the tops of the beets in row 14. Further forward movement of defoliator 12 and shoe 16 causes shoe 16 to slide upon the beets until the beets slide past trailing edge 22 and engage the outer periphery of disc 32. Engagement by disc 32 cuts the top portion from the beet, with the height of the cut above the ground surface being dependent upon the height of shoe 16 above the ground surface. It can then be appreciated that the lower portion of the cut beet below the cut is still at least partially embedded in the ground surface and passes beneath the lower surface of disc 32. The upper portion of the cut beet above the cut is separated from the lower portion and passes onto the upper surface of disc 32. Due to the tilt of disc 32 in a plane not parallel to the horizontal movement direction, the upper portions of the cut beet tend to travel along a cord of the periphery of disc 32 adjacent to the periphery of disc 32 and substantially spaced from axis 34 and have less of a tendency to travel on the upper surface of disc 32 as it rotates about axis 34 and thus has self-cleaning attributes. In the event that the upper portions of the cut beet should ride disc 32 as it rotates, they do not have a tendency to clog between disc 32 and trailing edge 22 due to the parallel relation of edge 22 to a tangent of disc 32. Specifically, if edge 22 were not in a tangent relation, the spacing between the periphery of disc 32 and edge 22 on one side of the point where the periphery of disc 32 is closest to edge 22 would be closer than the opposite side of that point, with the spacing being generally wedge shaped as opposed to bow-tie shaped as in the preferred form. The upper portions of the beets have a greater tendency to clog with decreased spacing which would exist if edge 22 were not in a tangential nature.

It should also be appreciated that mount 38 of the preferred form of the present invention and particularly the rotatable mounting of disc 32 from below is also advantageous. Specifically, any upper portions of the cut beet or other debris that ride disc 32 would have a tendency to catch on any shafts or the like which mounted disc 32 from the top such as shown in U.S. Pat. No. No. 3,583,136 and lead to clogging of the scalping apparatus. Likewise, depending upon the particular mounting, the bearings of top mounted discs can have greater exposure to dirt and moisture and thus wear. In apparatus 10 according to the most preferred teachings of the present invention, any upper portions of the cut beet or other debris that ride disc 32 will not catch or clog, but rather simply rotates with disc 32 and on subsequent rotations fall therefrom. In fact, apparatus 10 according to the preferred teachings of the present invention actually helps clean row 14 as it moves through the field.

Another major advantage of apparatus 10 according to the preferred teachings of the present invention is that disc 32 can engage the beets in row 14 at its lowest point on the periphery and still rotate about axis 34. Specifically, prior disc scalpers were only tilted where the axes were in planes parallel to the horizontal movement direction and rows 14. It can then be appreciated that beets engaging the lowest point of the disc would not place a torque force on the disc to cause rotation. To cause rotation in prior nonpowered disc scalpers, the axis of the disc was moved to one side or the other of row 14 such that the beets at least theoretically engaged the disc to one side of the lowest point such that torque forces on the disc would cause rotation. Not engaging the beet at the lowest point of the disc is disadvantageous due at least to increased wear, loss of depth control, and the like. Further, it can be appreciated that engagement of the beets at the desired offset location does not always occur due to variations in the shapes of the beets, due to variations of the straightness of rows 14, and due to the inability of the operator to maintain defoliator 12 and the scalping apparatus 10 mounted thereon at a constant relative position to rows 14. Thus, prior nonpowered disc scalpers had difficulty in keeping the disc rotating and did not operate very well. However, due to the offset of axis 34 in planes which are not parallel to rows 14, torque forces are always placed upon disc 32 to rotate about axis 34 and allow disc 32 to engage beets at its lower point on the periphery to avoid the problems of prior nonpowered disc scalpers.

It can be appreciated that the rotation of disc 32 and the slicing action thereof through the beets keeps the periphery of disc 32 sharp, so sharpening of disc 32 is not required.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Nonpowered scalping apparatus movable along a ground surface in a horizontal movement direction parallel to a row of plants having at least portions embedded in the ground surface comprising, in combination: a disc having a circular periphery; and means for rotatably mounting the disc about an axis which is tilted at an acute angle to the ground surface in a plane which is generally perpendicular to the ground surface and which is substantially nonparallel to the horizontal movement direction and the row, with the disc being held at the acute angle when the scalping apparatus is moved in the horizontal movement direction with the plants engaging the circular periphery of the disc while the disc moves in the horizontal movement direction causing the disc to rotate without being powered.

2. The scalping apparatus of claim 1 wherein the circular periphery of the disc has a lowest point, with the disc being held with the lowest point being vertically below the remaining points of the circular periphery with the row of plants engaging the circular periphery of the disc at the lowest point when the scalping apparatus is moved in the horizontal movement direction.

3. The scalping apparatus of claim 2 wherein the plane is at an acute angle in the order of 20°–45° to the horizontal movement direction and to the row.

4. The scalping apparatus of claim 3 wherein the axis is tilted at an angle in the order of 30° to the ground surface.

5. The scalping apparatus of claim 4 further comprising, in combination: means for moving the rotatably mounting means perpendicular to the ground surface comprising, in combination: a shoe for sliding on the row of plants, with the rotatably mounting means being mounted to and for relative movement with the shoe, with the shoe having a trailing edge which is spaced from and parallel to a tangent of the circular periphery of the disc.

6. The scalping apparatus of claim 5 wherein the rotatably mounting means comprises a pivot post located below and behind the disc in the horizontal movement direction, with the pivot post comprising the axis.

7. The scalping apparatus of claim 1 further comprising, in combination: means for moving the rotatably mounting means perpendicular to the ground surface comprising, in combination: a shoe for sliding on the row of plants, with the rotatably mounting means being mounted to and for relative movement with the shoe, with the shoe having a trailing edge which extends substantially nonparallel to the horizontal movement direction and is spaced from and parallel to a tangent of the circular periphery of the disc.

8. The scalping apparatus of claim 7 wherein the trailing edge is at an angle in the order of 20°–45° to the horizontal movement direction and to the row.

9. The scalping apparatus of claim 8 wherein the circular periphery of the disc has a lowest point, with the disc being held with the lowest point being vertically below the remaining points of the circular periphery with the row of plants engaging the circular periphery of the disc at the lowest point when the scalping apparatus is moved in the horizontal movement direction.

10. The scalping apparatus of claim 1 wherein the axis is tilted at an angle in the order of 30° to the ground surface.

11. Scalping apparatus movable along a ground surface in a horizontal movement direction parallel to a row of plants having at least portions embedded in the ground surface comprising, in combination: a disc having a circular periphery; and means for rotatably mounting the disc about an axis which is tilted at an acute angle to the ground surface in a plane which is generally perpendicular to the ground surface and which is substantially nonparallel to the horizontal movement direction and the row, with the plants engaging the circular periphery of the disc while the disc moves in the horizontal movement direction; wherein the plane is at an acute angle in the order of 20°–45° to the horizontal movement direction and to the row.

12. The scalping apparatus of claim 11 further comprising, in combination: means for moving the rotatably mounting means perpendicular to the ground surface comprising, in combination: a shoe for sliding on the row of plants, with the rotatably mounting means being mounted to and for relative movement with the shoe, with the shoe having a trailing edge which extends substantially nonparallel to the horizontal movement direction and is spaced from and parallel to a tangent of the circular periphery of the disc.

13. The scalping apparatus of claim 11 wherein the circular periphery of the disc has a lowest point, with the row of plants engaging the circular periphery of the disc at the lowest point when the scalping apparatus is moved in the horizontal movement direction.

14. Scalping apparatus movable along a ground surface in a horizontal movement direction parallel to a row of plants having at least portions embedded in the ground surface comprising, in combination: a disc having a circular periphery; and means for rotatably mounting the disc about an axis which is tilted at an acute angle to the ground surface in a plane which is generally perpendicular to the ground surface and which is substantially nonparallel to the horizontal movement direction and the row, with the plants engaging the circular periphery of the disc while the disc moves in the horizontal movement direction; wherein the rotatably mounting means comprises a pivot post located below and behind the disc in the horizontal movement direction, with the pivot post comprising the axis.

15. Scalping apparatus movable along a ground surface in a horizontal movement direction parallel to a row of plants having at least portions embedded in the ground surface comprising, in combination: a disc having a circular periphery, an upper surface, and a lower surface; and means for rotatably mounting the disc about an axis which is tilted at an acute angle to the ground surface, with the plants engaging the circular periphery of the disc while the disc moves in the horizontal movement direction and being cut into a lower portion which is at least partially embedded in the ground surface and an upper portion which is separated from the lower portion, with the lower portion passing beneath the lower surface of the disc and the upper portion passing onto the upper surface of the disc, with the disc being rotatably mounted exclusively from beneath the lower surface of the disc and the upper surface being free of shafts and the like upon which debris has a tendency to catch.

16. The scalping apparatus of claim 15 wherein the rotatably mounting means comprises a pivot post located below and behind the disc in the horizontal movement direction, with the pivot post comprising the axis.

17. The scalping apparatus of claim 16 wherein the disc is rotatable about the pivot post.

18. The scalping apparatus of claim 16 wherein the rotatably mounting means further comprises, in combination: a first arm having a first end; a second arm having a first end and a second end, with the first end of the first arm being interconnected to the first end of the second arm; and a third arm having a first end and a second end, with the first end of the third arm being interconnected to the second end of the second arm, with the pivot post extending from the third arm adjacent to the second end, with the third arm located beneath the lower surface of the disc.

19. The scalping apparatus of claim 18 wherein the first, second, and third arms are integrally connected.

20. The scalping apparatus of claim 18 further comprising, in combination: means for moving the rotatably mounting means perpendicular to the ground surface comprising, in combination: a shoe for sliding on the row of plants, with the first arm having a second end which is mounted to and for relative movement with the shoe.

* * * * *